Feb. 14, 1961   V. E. McKAY   2,972,134
SAFETY DEVICE FOR MOTOR VEHICLES
Filed April 26, 1957   3 Sheets-Sheet 1
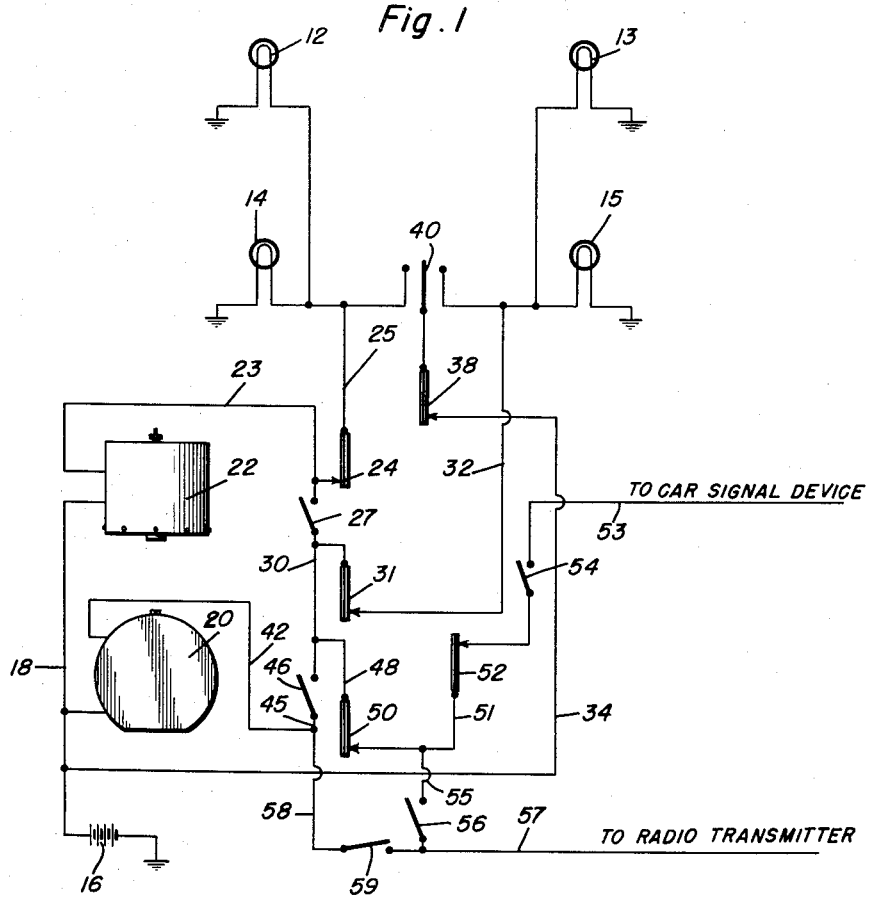
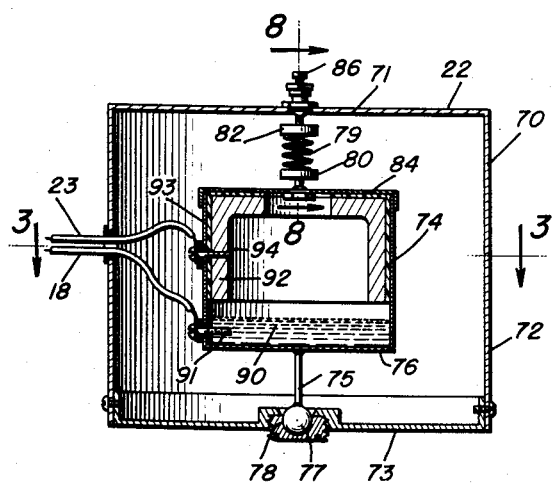
Victor Edward McKay
INVENTOR.

Feb. 14, 1961

V. E. McKAY 2,972,134

SAFETY DEVICE FOR MOTOR VEHICLES

Filed April 26, 1957

Victor Edward McKay
INVENTOR.

BY *Clarence A. O'Brien*
*and Harvey B. Jackson*
Attorneys

Feb. 14, 1961
V. E. McKAY
2,972,134
SAFETY DEVICE FOR MOTOR VEHICLES
Filed April 26, 1957
3 Sheets-Sheet 3
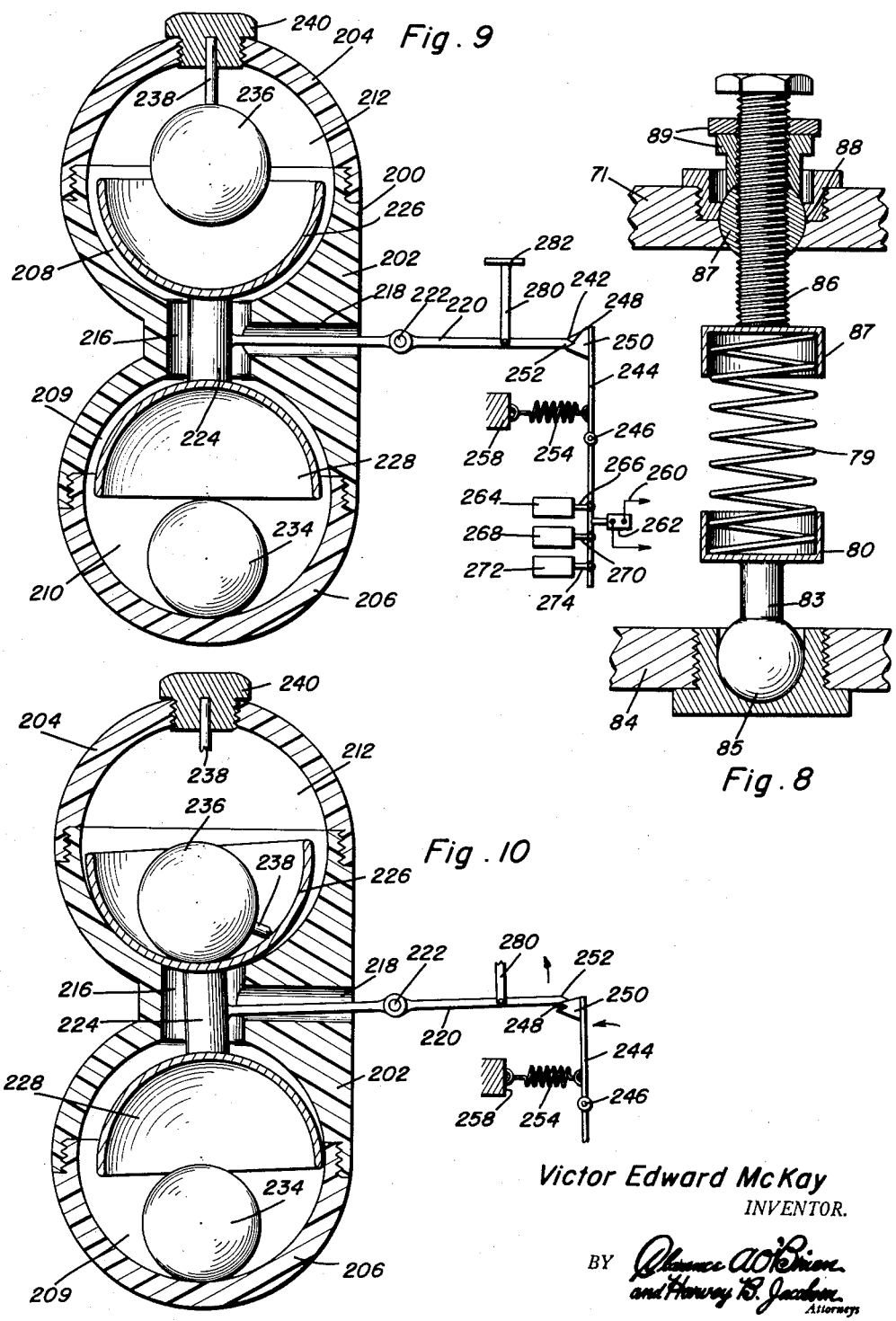
Victor Edward McKay
INVENTOR.

United States Patent Office 2,972,134
Patented Feb. 14, 1961

2,972,134

SAFETY DEVICE FOR MOTOR VEHICLES

Victor Edward McKay, Harrington Park, N.J. (46 Prospect Hill, Tiverton, R.I.); Virginia McKay, administratrix of the estate of said Victor Edward McKay, deceased Filed Apr. 26, 1957, Ser. No. 655,365

5 Claims. (Cl. 340—261)

This invention relates to safety equipment for motor vehicles, for example, automobiles, trucks, airplanes and other types of transportation.

An object of the invention is to provide a safety device capable of yielding one or more signals in response to a rapid deceleration as would be occasioned by impact or other distress conditions, such as overturning and sliding to a stop, and/or responsive to the overturned or dangerously tilted position of a motor vehicle in order to yield one or more distress signals, such as audible or visible or both, whereby aid may be rushed directly to the motor vehicle in an attempt to minimize additional injuries caused by failure to treat the same as promptly as possible.

A further object of the invention is to provide safety equipment for a motor vehicle of one type or another, wherein the equipment is capable of being used at the will of the motorist in the absence of an accident and, in addition, the safety device becomes automatically operative in response to a distressed condition as would be occasioned by impact or other results of reasonably serious crashes.

Another object of the invention is to provide a practical attachment for a motor vehicle which may be contained in a small box and located at a convenient place in the motor vehicle, such as under, in the trunk or attached in some other less obscure place as on a part of the frame beneath the floor of the motor vehicle.

A further object is to provide a vehicle safety device which uses novel switches that are responsive to shocks caused by impact, overturning or other accident conditions, the novel switches exercising control over signal circuits or devices.

A still further object of the invention is to provide a safety device in accordance with the previous descriptions wherein the device assumes a number of forms, one being practically entirely mechanical in nature, such as to refrain from relying on the electrical system of the safety device or of the motor vehicle and another typical adaptation being the use of an electrical circuit having many options and setting many signals into operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a schematic wiring diagram showing principally the wiring of a typical motor vehicle that is equipped with a signal device in accordance with the invention;

Figure 2 is a cross sectional view of a switch that is responsive to impact caused by accident of the motor vehicle, the switch of Figure 2 being adjustable so that the amount of force necessary to close the switch is governable;

Figure 8 is a sectional view on enlarged scale and taken on the line 8—8 of Figure 2;

Figure 9 is a sectional view showing a modification of the invention, this view illustrating a substantially completely mechanical switch adapted to actuate various mechanical signals and also any electrical signals deemed desirable; and Figure 10 is a sectional view quite similar to that of Figure 9 but showing the signal device in such position that the signal has been given.

Figure 3:
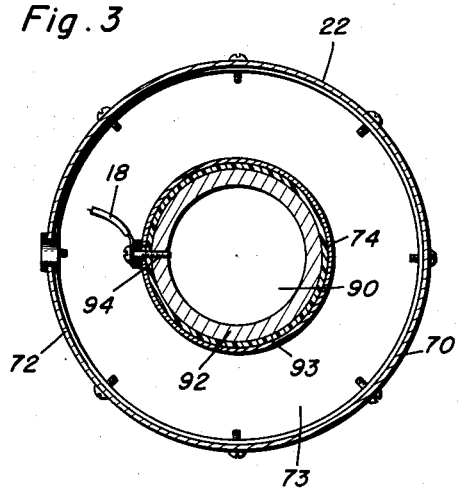
Figure 3 is a transverse sectional view taken on the line 3—3 of Figure 2.

In the accompanying drawings there is certain safety equipment which is constructed in accordance with the invention. This equipment is adapted to be applied to a motor vehicle of any type, for example, a truck, a passenger automobile, airplanes and boats.

Figure 1 shows an adaptation which is specially designed for automotive trucks or passenger cars equipped with headlights 12 and 13, together with tail lights 14 and 15, there being a schematic representation of the wiring used in connection with each. There is a source 16 of electrical potential, for example, a battery, and a main lead 18 extends from the ungrounded terminal of the battery in order to feed the impact responsive, normally open switches 20 and 22. Switch 22 has wire 23 extending therefrom and to a flasher 24 of any standard type, as the bimetallic thermally sensitive unit which is commonly employed for various purposes in truck signal light circuits. Wire 25 leads from the flasher to the wiring on the left side of the motor vehicle for the lights 12 and 14. Switch 27 is interposed in conductor 30 which feeds flasher 31, the latter being connected by conductor 32 to the circuit for lamps 13 and 15 on the right side of the motor vehicle. Therefore, by manual operation of switch 27, the impact responsive switch 22 is made to control the lamps on the left side or the right side or both sides of the motor vehicle, energizing them intermittently in order to yield a visual in response to closing of the normally open switch 22.

Conductor 34 extends from conductor 18 and therefore is in operative connection with the ungrounded side of the battery 16. Conductor 34 feeds flasher 38 that is connected to double throw switch 40 in order to energize either the left or the right signal lamps of the motor vehicle independent of impact responsive switches 20 or 22. Switch 40, therefore, will be a manually operable switch under the control of the motorist.

Impact switch 20 is fed by conductor 18 and has lead wire 42 extending from a switch terminal thereof to wire 45. Manually operable switch 46 is in wire 45, the latter being a part of wire 30, so that when the manual switch 46 is closed and the impact closed switch 20 is actuated, energy is capable of flowing through switches 20 and 46 to the flasher unit 31 and the flasher unit 24, provided that manual switch 27 is closed. This will ultimately cause the lamps 12, 13, 14 and 15 to be intermittently operated, just as intermittent operation was caused in response to closing the impact closed switch 22.

In addition, wire 48 extends from wire 30 or 45 inasmuch as these two wires join and become one and has a flasher 50 therein. This flasher provides an intermittent electrical signal which is conducted by wire 51 through a second flasher 52 and then to wire 53. Wire 53 is operatively connected to a signal device, for example, a signal which would eject a flag, gas inflated balloon or some other signal from the body of the automobile or truck so as to be visible from a considerable distance from the actual scene of the accident. Other signals which could be energized by wire 53 would be any of the audible, visible or tactile signals that are known at the present time and that are adaptable and suitable for the purpose. Manually operable switch 54 is in the line 53 so as to enable the motorist to have manual control over the signal which is triggered by energy in wire 53.

One of the signals contemplated is a small radio transmitter which would yield a distress signal on a particular frequency, for example, the local police patrol radio band. Wire 55 extending from wire 51 has a manually controllable switch 56 therein which is connected to electric line 57. This electric line schematically represents proper connection to such a radio transmitter. In addition, a wire 58 extends from wire 45 and has another manual switch 59 therein by which wire 57 is connected to wire 58. This enables the motorist to select the radio signal independent of all the other signals, the radio signal to be operative in response to closing of the impact responsive switch 20. The same holds true of all other signals and flashing lights. The motorist may select any one or more of the signals by selection of the switch which are to be moved to the switch closed positions.

Figure 7:
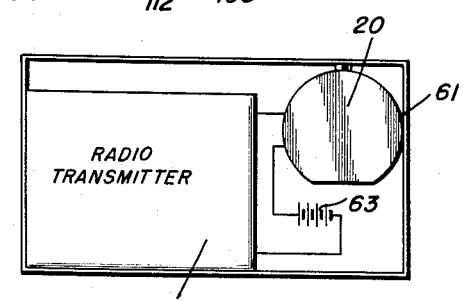
Figure 7 is a schematic elevational view showing a subcombination of the organization in Figure 1 and in a self-contained unit that is more easily applied at any part of the motor vehicle.

As shown in Figure 7, any part of the general organization of Figure 1 may be selected and isolated as an operable unit of the more comprehensive whole system shown in Figure 1. Container 61 is bolted, rested or otherwise adhered or attached or carried by the motor vehicle. Radio transmitter 62 is in the receptacle 61 and is operatively connected with a source 63 of electrical potential, as a battery. Normally open and impact closed switch 20 is wired in series with the transmitter 62 and the source of energy so that switch 20 automatically closes the radio circuit in response to an impact, whereby a radio signal is yielded at the instant that the motor vehicle is in an accident of reasonably serious proportions.

Switch 22 is shown in Figures 2–4 and 8. It is made of a housing 70, the latter being formed of a side wall 72, together with top and bottom walls 71 and 73, respectively, that are attached to the side wall 72. Capsule 74 is disposed in housing 70 and is held suspended between the top and bottom walls of housing 70. Vertical post 75 extends from the bottom 76 of the capsule 74 and has a ball 77 at the lower extremity. This ball is in spherical seat 78 carried by wall 73. Accordingly, the capsule is capable of movement in any direction about the ball and socket or seat at the bottom of housing 70. Compression spring 79 is seated in lower cup 80 and upper cup 82, with lower cup 80 being fixed to a short post 83 whose lower end is operatively connected with the top wall 84 of capsule 74 by a ball and socket assembly 85. The upper cup 82 is fixed to an adjusting screw 86 which passes through a centrally threaded ball 87, the latter being in socket 88 and held in an adjusted position by jam nuts 89 so that the compressive energy stored in spring 79 is selectable. Each of the ball seats or sockets are formed by inserts that are threaded in place or otherwise formed in accordance with present manufacturing techniques.

Figure 4:
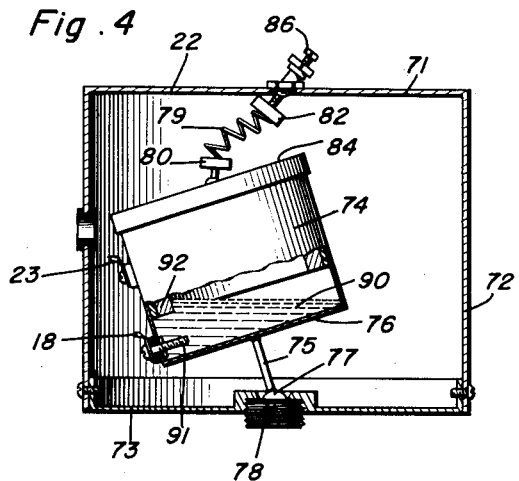
Figure 4 is a cross sectional view similar to Figure 2 but showing the switch in the closed position.

There is a pool 90 of mercury in capsule 74 which is adapted to bridge the contacts 91 and 92 when capsule 74 is tilted (Figure 4). Contact 91 is in the form of a binding post for wire 18, the latter being threaded in an insulating grommet carried by a side wall of capsule 74. Contact 92 is formed by an annulus held in place within the capsule but insulated by a non-conductive liner 93 between the inner surfaces of the walls of the capsule 74 and the annulus 92. Screw 94 is connected to the annulus 92, passing through a hole in the side wall of capsule 74 and through an insulating grommet in order to form a binding post for the wire 23.

In use of the switch 22, capsule 74 remains erect or upright (Figure 2) until the reaction of an impact, as would be caused by an automobile or truck colliding with another or with a stationary object. Then, the shock transmitted to the capsule 74 through inertia of the system causes the capsule 74 to tilt (Figure 4), thereby moving it from and disturbing the over-center relationship between spring 79 and the post 75. Instead of the internal energy of spring 79 tending to hold the capsule erect, once the capsule becomes tilted a slight distance to misalign the post 75 and longitudinal axis of the spring 79, the stored energy in the spring pushes the capsule to a full tilted position, whereby the pool 90 of mercury bridges the contacts 91 and 92 and closes the switch and all circuits controlled by it.

Figure 5:
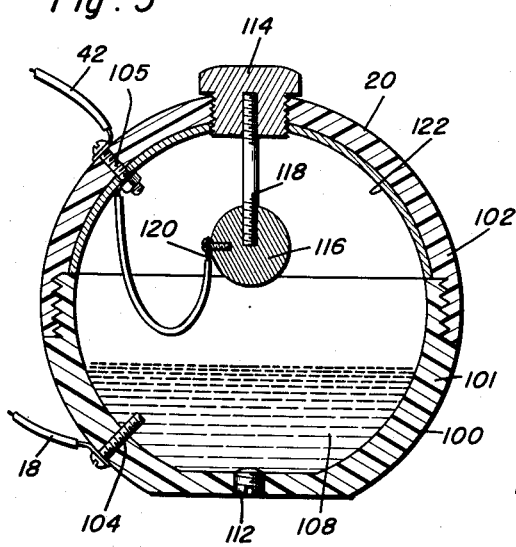
Figure 5 is a sectional view of a second switch designed to close in response to a larger impact force.
Figure 6:
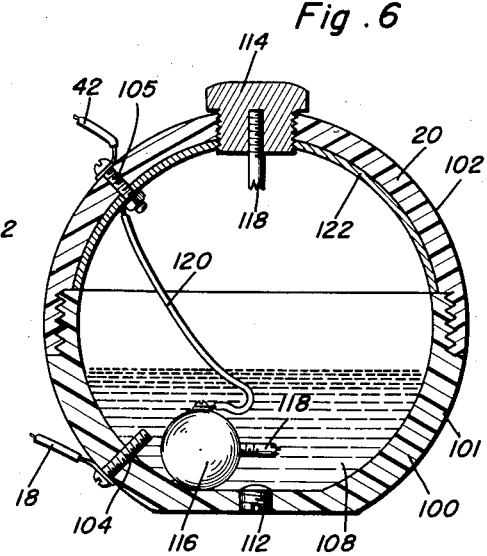
Figure 6 is a sectional view similar to Figure 5 but showing the position of the switch of Figure 5 after it has been closed.

The normally open and impact operated switch 20 is seen in detail in Figures 5 and 6. It consists of a housing 100 made of two parts 101 and 102 which, combined, have the appearance (substantially) of a sphere. They are made of plastic or some other non-conductive substance and have contacts 104 and 105, respectively, carried by them. The contacts are made of bolts so as to function as binding posts for the wires 18 and 42, respectively. A pool 108 of mercury is in housing 100 and is of sufficient depth to keep the contact 104 covered at all times. Filler plug 112 is in the bottom of the housing 100 and there is a contact suspending plug 114 threaded in the top part of housing 100. The last mentioned contact consists of a ball 116 at the end of a frangible post 118, the latter being attached to plug 114 and having a conductive wire 120 fastened to contact 116. The opposite end of the wire 120 is attached to the contact 105, the latter touching the annular contactor 122 fitted in the top part 102 of housing 100.

The operation of normally opened and impact closed switch 20 is that when a high value deceleration is reacted on the switch 20, as by impact in a motor vehicle accident, frangible post 118 breaks, enabling the ball 116 to fall into the pool 108 of mercury (Figure 6), thereby establishing electrical continuity between the contacts 104 and 105. This closes switch 20 so that it conducts electrical energy.

Should the motor vehicle overturn, the switch 20 and the switch 22 will operate in the same way. The pool of mercury 90 or the pool 108 will close the circuit between the lowermost contacts which are indicated at 91 in switch 22 and at 104 in switch 20, with the annular contacts 92 and 122 respectively. In this regard, it may be found desirable to include a thin band of conductive material which would extend around the inner surface of the walls of the capsule 74 and housing 100 respectively to assure that there will definitely be electrical continuity between the two contacts of each of the switches. Therefore, switches 20 and 22 not only function as impact responsive devices for closing a circuit, but also function as elevation or azimuth responsive devices to close the same circuits.

A mechanical counterpart of the embodiment of the invention shown in Figure 1 is illustrated in Figures 9 and 10. It consists of a housing 200, a body 202 and two covers 204 and 206, respectively, which are threaded on the ends of the body 202. The covers are semispherical, as are the recesses 208 and 209 at the ends of body 202. Therefore, the covers and the recesses cooperate to enclose two spherical chambers 210 and 212 respectively. Passage 216 is in the center of the body 202 and is connected to the chamber 212 and 210, establishing communication between them. Passageway 218 intersects passage 216 and accommodates beam 220 which is pivoted on a pin 222 intermediate its ends. Connecting post 224 is attached at right angles to the inner extremity of beam 220 and has semispherical pans 226 and 228 at its opposite ends, these pans being located in the chambers 212 and 210 respectively and being of only slightly smaller diameter.

Ball 234 is free in chamber 210, this chamber being the lowermost of the two. Ball 236 is suspended on frangible post 238 above pan 226. Plug 240 is threaded in a hole in cover 204 above pan 226. The purpose of balls 234 and 236 is twofold. Should the motor vehicle overturn, ball 234 falls in pan 228, thereby deflecting beam 220 and causing it to oscillate about the axis of spindle 222. Should the motor vehicle be subjected to an impact, as when striking another vehicle or some other object, frangible post 238 will break (Figure 10), permitting ball 236 to fall in pan 226. This deflects beam 220 about spindle 222, which releases latch 242.

Pivoted arm 244 is mounted for oscillation on spindle 246 with the latch 242 at the upper end thereof. The latch is made of a notch 248 in plate 250 at the upper end of arm 244 and the pointed extremity 252 on beam 222. Spring 254 has one end attached to arm 244 and the other end anchored, as by being secured to stationary surface 258. The tension of spring 254 holds the pointed extremity 252 in its notch 248 until separated forcibly therefrom, as would be the case when beam 220 is oscillated by either ball 234 or ball 236.

The lower extremity of arm 244 is used as a trigger for any number of signals. One would be a signal circuit 260 having control switch 262 therein. This signal circuit could operate a radio transmitter 62 (Figure 7) or could operate any of the previously described signals requiring electrical energy for actuation. These include visual, tactile and audible signals. In addition or in lieu thereof, such signals as could be rendered by the opening of a compressed gas cylinder or capsule 264 may be adopted by having trigger 266 attached to arm 244 for operation by the arm 244 as it is actuated. Another addition or option would be a spring-wound signal device 268 also operated by or set in motion in response to pulling of a trigger 270 that is attached to the arm 244. A clock mechanism to yield intermittent or continual signal of any type is contemplated. Another option is the use of a spring-ejected flag that is adapted to be contained in a casing 272. Moreover, kites, windsocks, parachutes, etc. may be ejected by merely pulling the trigger 274 that is attached to arm 244 from the lid retaining part of the casing 272. All of this takes place practically instantaneously with the impact of the motor vehicle.

Manual resetting by push rod 280 is possible from within the motor vehicle having equipment such as that shown in Figures 9 and 10. Push rod 280 is pivoted at one end to beam 220 and has a handle 282, knob or the like attached to the outer extremity thereof.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:
1. A vehicle safety device comprising a signal, an arm by which said signal is rendered operative, latch means positioned proximate said arm to retain said arm in a cocked position, a beam operatively connected to said latch means for releasing the same upon oscillation of said beam, means responsive to impact and connected to said beam for oscillating said beam, said beam oscillating means including a body, a chamber in said body, a pan in said chamber, means connecting said pan to said beam, a weighted member located in said chamber, frangible means supporting said weighted member above said pan in said chamber and adapted to release said weighted member in response to impact so that the weighted member falls on said pan and oscillates said beam to release said latch and cause the signal to be actuated.

2. In a vehicle safety device, an oscillatable beam, a body having a chamber, a pan in said chamber, means mechanically connecting said pan to said beam, a weighted member in said chamber adapted to be disposed in said pan in order to displace said pan and thereby move said beam, a latch, an arm, means pivotally mounting said arm, said latch being operatively connected between said arm and said beam and arranged so that said beam holds said arm in a selected position so that when said beam is moved said latch is released enabling said arm to be moved, and signal operating means operatively connected to said arm for operation in response to movement of said arm.

3. The signal device of claim 2 wherein said weighted member is captive in said chamber but free to move therein so that when said body is inverted, said weighted member falls in said pan to cause said pan to be displaced.

4. The signal device of claim 3 wherein there is a second weighted member, a second chamber in said body within which said second weighted member is located, a frangible member supporting said weighted member in said second chamber so that said second weighted member is separable from said chamber in response to impact whose shock is transmitted to said body, a second pan, means mechanically connecting said second pan to said beam to oscillate the latter in response to reception of said second weighted member, and the second pan being located in said second chamber.

5. An impact responsive switch comprising a housing, an upper chamber in said housing, a lower chamber in said housing, a passageway communicating said two chambers, a passage communicating said passageway and the outside of said housing, a beam, said beam oscillatably supported externally of said housing and extending into said passage, a post transversely supported from said beam positioned in said passageway, a pan terminally carried by said post in each of said chambers, and a frangible post supporting a weight in said upper chamber, latch means releasable upon an oscillatory movement of said beam, a pair of normally open electrical contacts, said contacts adapted to be closed when said housing is subjected to an impact sufficient to break said frangible post causing said weight to fall into said pan to oscillate said beam to release said latch means.

References Cited in the file of this patent

UNITED STATES PATENTS

| | | |
|---|---|---|
| 1,400,229 | Murray | Dec. 13, 1921 |
| 2,547,199 | Dezzani | Apr. 3, 1951 |
| 2,663,861 | Heath | Dec. 22, 1953 |
| 2,806,915 | Fowler | Sept. 17, 1957 |
| 2,806,916 | Gibble | Sept. 17, 1957 |

FOREIGN PATENTS

| | | |
|---|---|---|
| 386,034 | Great Britain | Jan. 12, 1933 |